(12) United States Patent
Oetken et al.

(10) Patent No.: US 11,144,055 B2
(45) Date of Patent: Oct. 12, 2021

(54) CONSTRUCTION SITE PLANNING FOR AUTONOMOUS CONSTRUCTION VEHICLES

(71) Applicant: Caterpillar Paving Products Inc., Brooklyn Park, MN (US)

(72) Inventors: Nicholas A. Oetken, Brooklyn Park, MN (US); Timothy M. O'Donnell, Long Lake, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 276 days.

(21) Appl. No.: 16/135,344

(22) Filed: Sep. 19, 2018

(65) Prior Publication Data
US 2020/0089230 A1    Mar. 19, 2020

(51) Int. Cl.
*G05D 1/00* (2006.01)
*G05D 1/02* (2020.01)

(52) U.S. Cl.
CPC ......... *G05D 1/0088* (2013.01); *G05D 1/0229* (2013.01); *G05D 2201/0202* (2013.01)

(58) Field of Classification Search
CPC ........ G05D 1/0088; G05D 1/02; G05D 1/021; G05D 1/0229; G05D 2201/0202; G05D 2201/0208; G05D 2201/02
See application file for complete search history.

(56) References Cited

U.S. PATENT DOCUMENTS

| | | | |
|---|---|---|---|
| 3,841,410 A | 10/1974 | Nikitin et al. | |
| 6,128,574 A | 10/2000 | Diekhans | |
| 7,228,214 B2 | 6/2007 | Flann et al. | |
| 7,505,848 B2 | 3/2009 | Flann et al. | |
| 8,060,269 B2 | 11/2011 | Dix | |
| 8,639,393 B2 | 1/2014 | Taylor et al. | |
| 9,598,843 B2 | 3/2017 | Wei et al. | |
| 9,988,787 B1 * | 6/2018 | Wang | G01S 19/49 |
| 2009/0084173 A1 * | 4/2009 | Gudat | G01S 17/88 73/146 |
| 2012/0190386 A1 * | 7/2012 | Anderson | G01S 19/14 455/456.3 |
| 2012/0330621 A1 * | 12/2012 | Detwiler | G06F 30/13 703/1 |
| 2016/0009304 A1 * | 1/2016 | Kumar | B61L 27/0077 701/19 |
| 2016/0291147 A1 * | 10/2016 | Bellett | G01S 13/867 |
| 2017/0329875 A1 * | 11/2017 | Detwiler | G06Q 10/06 |
| 2018/0162410 A1 * | 6/2018 | Skillsater | B60W 50/14 |
| 2018/0333629 A1 * | 11/2018 | Saitoh | A63B 71/0619 |
| 2019/0311621 A1 * | 10/2019 | Pedersen | G08G 1/163 |
| 2019/0339701 A1 * | 11/2019 | Pedersen | G05D 1/0044 |

* cited by examiner

*Primary Examiner* — Hunter B Lonsberry
*Assistant Examiner* — Daniel L Greene
(74) *Attorney, Agent, or Firm* — Schwegman, Lundberg & Woessner (57) ABSTRACT

A system for controlling an autonomous construction vehicle includes a controller configured to identify a boundary of a construction site, identify a slope within the boundary of the construction site, determine if the slope exceeds a predetermined threshold value, and create a path plan for an autonomous construction vehicle based on whether the first slope exceeds the threshold value to align the movement of the autonomous construction vehicle with the slope.

20 Claims, 4 Drawing Sheets

CONSTRUCTION SITE PLANNING FOR AUTONOMOUS CONSTRUCTION VEHICLES

TECHNICAL FIELD

The present disclosure generally relates to the field of construction. More particularly, the present disclosure relates to systems and methods of construction site planning for autonomous construction vehicles.

BACKGROUND

Autonomous worksites can employ a plurality of autonomous machines to perform a variety of tasks that may be controlled by a combination of on-board and off-board computers, processors, and other electronic controllers rather than human operators. As a result, autonomous operation may enhance the productivity of the machines, and reduce the human resources required for controlling the operation of the worksite. Construction site planning for autonomous construction vehicles involves determining the path a construction vehicle will take. Various conventional attempts at construction site planning may not be automatic, may be less efficient, may limit the function of the construction vehicle, may risk damaging the construction vehicle, etc.

SUMMARY OF THE INVENTION

To summarize at least a portion of the disclosure, a non-limiting list of examples is provided here:

In one aspect, the present disclosure relates to a method for controlling an autonomous construction vehicle. The method includes identifying a boundary of a construction site and identifying a first slope within the boundary of the construction site. The method also includes determining if the first slope exceeds a predetermined threshold value. The method further includes creating, at a controller, a first path plan for the autonomous construction vehicle based on whether the first slope exceeds the threshold value and controlling the operation of the autonomous construction vehicle based on the first path plan.

In another aspect, the present disclosure relates to a method for controlling an autonomous construction vehicle. The method includes mapping, at a controller, a construction site plan including a worksite boundary. The method further includes accessing, at the controller, slope data corresponding to a surface within the worksite boundary. The method also includes mapping, at the controller, a first path plan onto the construction site plan such that a first slope is not a side slope relative to movement of the autonomous construction vehicle and wirelessly communicating the construction site plan from the controller to the autonomous construction vehicle.

In another aspect, the present disclosure relates to a system including an autonomous construction vehicle and a first controller. The first controller is configured to map a construction site plan including a worksite boundary, access slope data corresponding to a surface within the worksite boundary, map a first path plan onto the construction site plan such that a first slope that exceeds a predetermined threshold value is not a side slope relative to movement of the autonomous construction vehicle. The autonomous construction vehicle is configured to move according to the construction site plan.

These and other examples and features of the present devices, systems, and methods will be set forth in part in the following Detailed Description. This overview is intended to provide a summary of subject matter of the present patent application. It is not intended to provide an exclusive or exhaustive removal of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present disclosure provides systems and methods for construction site planning for autonomous construction vehicles based on determining the slope of the ground. If the slope exceeds a predetermined threshold value, the construction site plan designates a path such that the movement of the autonomous construction vehicle is such that the slope does not represent a side slope. For the purposes of this disclosure a side slope may include a slope that is perpendicular relative to the movement of the vehicle. In at least one example, the side slope is a slope that extends from one side of the vehicle to another side of the vehicle (rather than front to rear or rear to front). In some examples, the threshold value for the side slope includes a range that is based on performance characteristics of the autonomous construction vehicle. In areas where there are multiple slopes exceeding the threshold value in different directions, the controller would separate the construction site into sections and create separate path plans for each section of the construction site. By creating a site plan based on the slope of the construction site, autonomous construction vehicle moves up and down the slope, rather than across the slope, helping to avoid inefficiencies (e.g. uneven compaction, etc.), limiting the function of the construction vehicle, risking tip-over or sliding of the construction vehicle, risking damage of the construction vehicle, etc.

For the purposes of this disclosure, "autonomous" means both "autonomous and "semi-autonomous" such that autonomous construction vehicles may include fully autonomous construction vehicles or semi-autonomous construction vehicles which are controlled by a predetermined construction site plan designating the path that the construction vehicle is to take within a worksite boundary. In at least one example, "about" and "approximately" may mean within 10% of a stated value. In at least one example, "about" and "approximately" may mean within 1% of a stated value.

Figure 1:
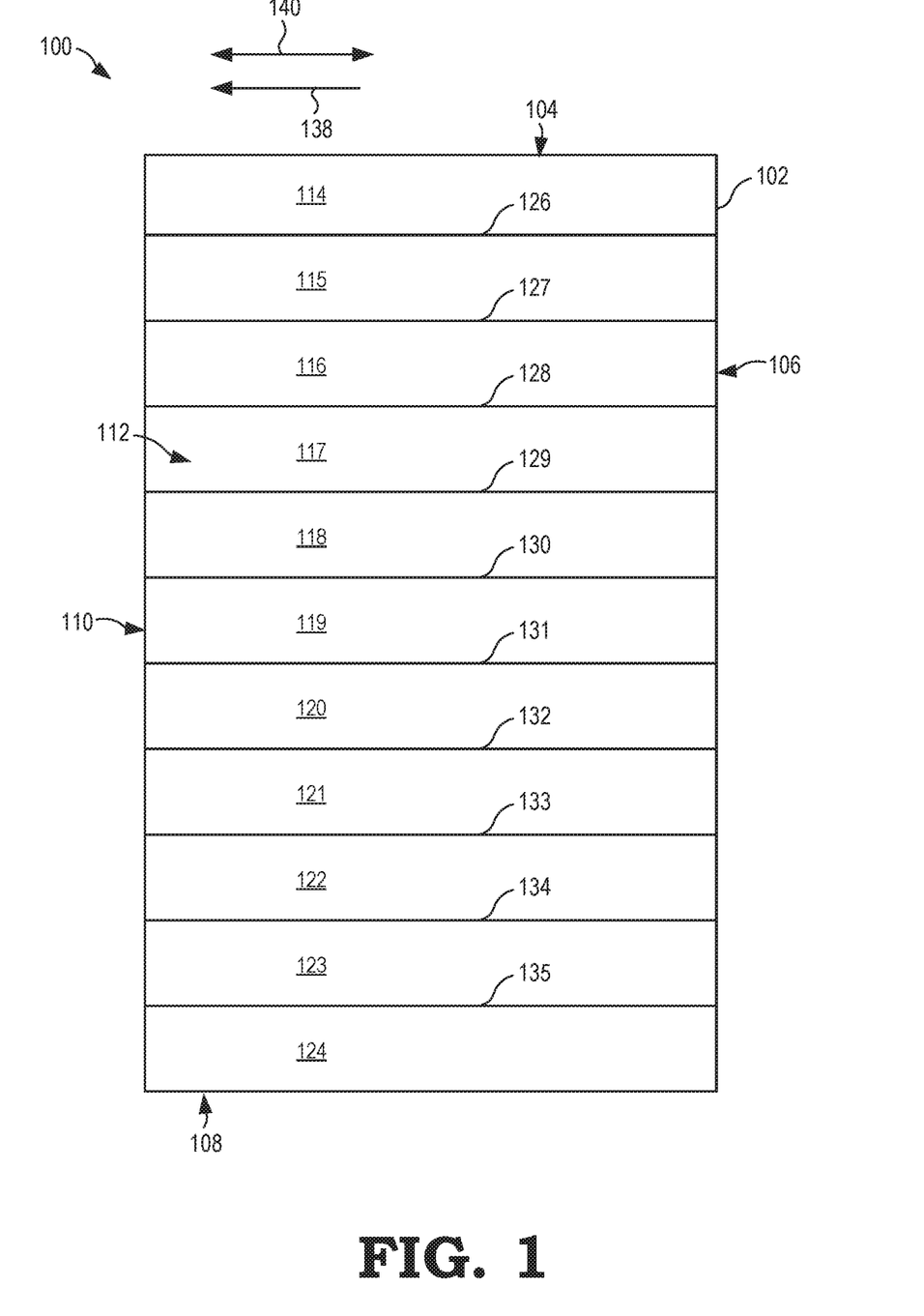
FIG. 1 is a plan view of a construction site plan for an autonomous construction vehicle, in accordance with at least one example.

FIG. 1 is a plan view of a construction site plan 100 for an autonomous construction vehicle, in accordance with at least one example. The construction site plan 100 includes a boundary 102 defining the worksite. In the illustrated example, the worksite boundary 102 is a rectangle comprising four edges 104, 106, 108, 110. However, in other examples, the worksite boundary 102 may define any of a variety of shapes with any of a number of edges. The construction site plan 100 further includes a path plan 112 indicating a number of paths 114, 115, 116, 117, 118, 119, 120, 121, 122, 123, 124 defined by a number of path lines 126, 127, 128, 129, 130, 131, 132, 133, 134, 135 and the edges 104, 106, 108, 110 of the worksite boundary 102.

Each path 114-124 indicates a path for an autonomous construction vehicle. In at least one example of the present disclosure, the path plan 112 is based on a slope within the worksite boundary 102, such that the path lines 126-135 and the paths 114-124 are aligned with the slope, and the construction vehicle will move up and down the slope. In the illustrated example, the slope extends between edge 110 and edge 106 of the worksite boundary 102. For the purposes of description, edge 110 is designated as elevated relative to edge 106 and a slope direction 138. As such, the path plan 112 indicates a movement direction 140 such that the autonomous construction vehicle is to move up toward edge 10 and down toward edge 106 along the paths 114-124. For example, if the autonomous construction vehicle were to start at edge 106 of path 124, the autonomous construction vehicle would travel up the slope along path 124 toward edge 110, down the slope along path 123 toward edge 106, up the slope along path 122 toward edge 110, and so on until the autonomous construction vehicle has completed the construction site plan. While a starting point was designated for ease of description, any of a variety of starting points could be used and the principles of the path plan 112 would similarly apply.

In at least one example, the path plan 112 only takes into account slopes that exceed a threshold value. In at least one example the threshold value is selected from the range of about 10% to about 60%. In some examples the threshold value is selected from the range of about 15% to about 30%. In at least one example, the threshold value is about 15%. For the purposes of this disclosure, exceeding the threshold value means that the slope is as steep or steeper than the threshold value. In at least one example, the threshold value is about 30%. If a slope exceeds the threshold value, then the path plan 112 indicates a movement direction 140 of the autonomous construction vehicle that aligns with the slope direction 138. In the illustrated example, one of edges 104 and 108 may be elevated relative to the other such that a slope exists, but the slope does not exceed the threshold value, so the path plan 112 does not take any slope extending between edges 104 and 108 into account when determining the construction vehicle movement direction 140 and consequently the path lines 126-145 and paths 114-124.

In at least one example, the slope in the slope direction 138 may not be present for the entire construction site plan 100, in which case the path plan 112 will choose the remaining paths based on efficiency. For example, if there is no slope exceeding the threshold value for a first area (e.g. the area covered by paths 114-118) and a slope exceeding the threshold value in the slope direction 138 in a second area (e.g., the area covered by paths 119-124), the path plan 112 may use a single movement direction 138 for the entire construction site plan, so as to be more efficient. In another example, if the autonomous construction vehicle will move to a known location following the completion of the construction site plan, the path plan for the first area may be determined based on efficiency as it relates to moving the vehicle to the known location. In some examples, the construction site plan may indicate a movement direction that is not aligned with the slope direction, as long as the movement direction does not result in a side slope (i.e. a slope perpendicular to the movement direction or that otherwise extends from one side to the other side of the vehicle) that exceeds the threshold value. In the example of the construction site plan 100, the movement direction could not be perpendicular to the slope direction 138, since that would result in a side slope relative to the vehicle that exceeds the threshold value. However, the movement direction 140 need not be parallel to the slope direction 138 and could instead be transverse to the slope direction 138, as long as a slope extending from side to side of the vehicle does not exceed the threshold value.

Figure 2:
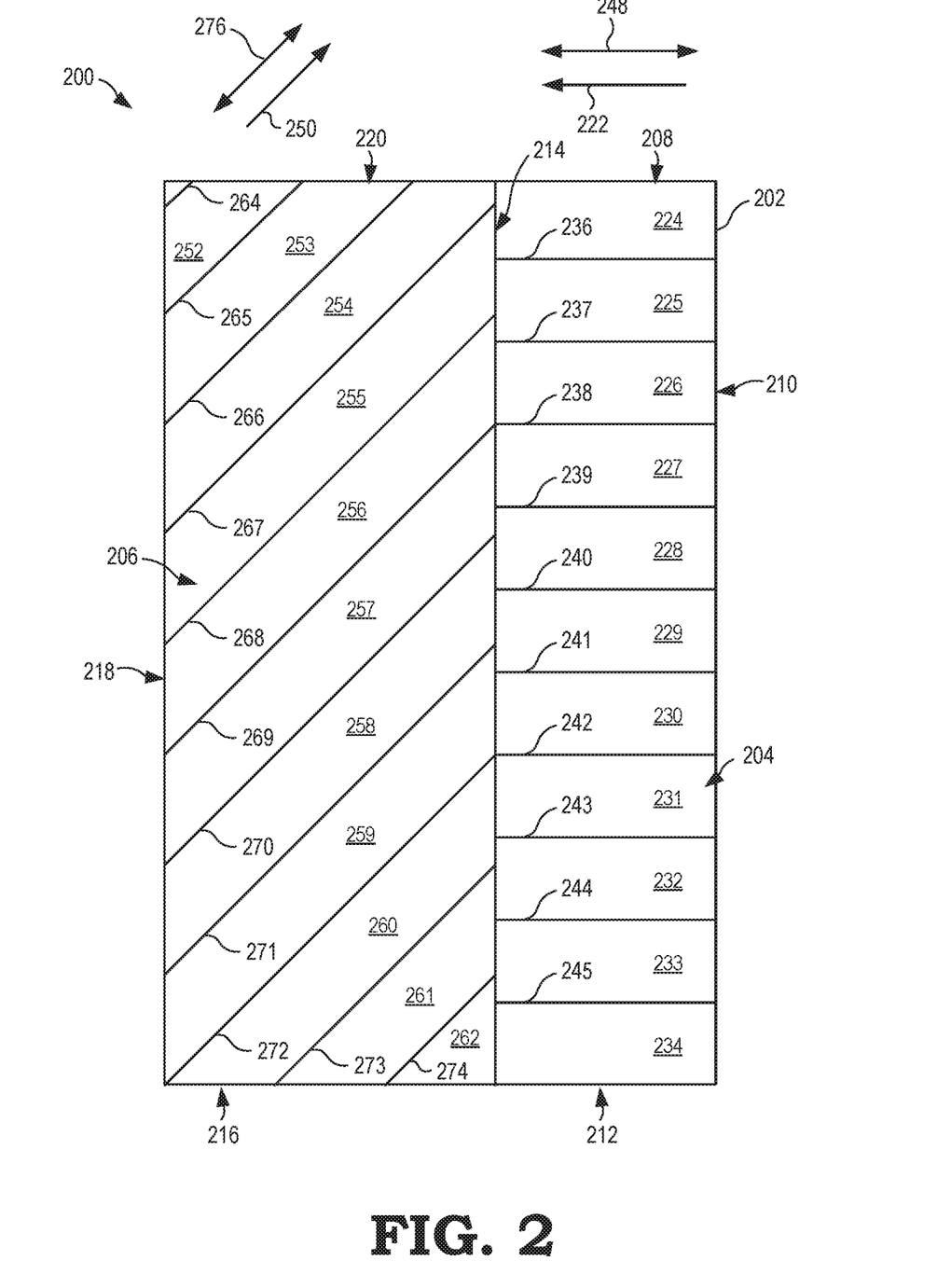
FIG. 2 is a plan view of a construction site plan for an autonomous construction vehicle, in accordance with at least one example.

FIG. 2 is a plan view of a construction site plan 200 for an autonomous construction vehicle, in accordance with at least one example. The construction site plan 200 includes a boundary 202 defining a worksite. In the illustrated example, worksite includes two slopes exceeding the threshold value, and as a result the construction site plan 200 divides the worksite defined by boundary 202 into two sections, each section including a separate path plan 204, 206. The first section is defined by section boundary lines 208, 210, 212, and 214 and the second section is defined by section boundary lines 216, 218, 220, and 214.

In the first path section, boundary line 214 is elevated relative to boundary line 210, such that the first slope exceeds the threshold value in slope direction 222. As a result, the first path plan 204 is mapped such the first paths 224, 225, 226, 227, 228, 229, 230, 231, 232, 233, 234 (defined by first path lines 236, 237, 238, 239, 240, 241, 242, 243, 244, 245) align with the first slope direction 222, and the autonomous construction vehicle will move in a first movement direction 248. For example, if the autonomous construction vehicle starts at boundary line 210 of path 224, it will move up the slope along path 224 toward boundary line 214, down the slope along path 225 toward boundary line 210, up the slope along path 226 toward boundary line 214, and so on.

In the second path section, boundary line 214 is elevated relative to boundary line 218, and boundary line 220 is elevated relative to boundary line 216, such that the second slope exceeds the threshold value in a second slope direction 250. As a result, the second path plan 206 is mapped such that the second paths 252, 253, 254, 255, 256, 257, 258, 259, 260, 261, 262 (defined by second path lines 264, 265, 266, 267, 268, 269, 270, 271, 272, 273, 274) align with the second slope direction 250, and the autonomous construction vehicle will move in a second movement direction 276. For example, if the autonomous construction is at boundary line 220 heading down the second slope along path 253 toward boundary line 218, it will then head up the second slope along the path 254 in second slope direction 250 toward boundary lines 220, 214, then down the second slope along path 255 toward boundary line 218.

In at least one example, the autonomous construction vehicle completes one of the first and second path plans 204, 206 before starting the other path plan 204, 206. In some examples, the construction site plan 200 may indicate the starting point for each path plan 204, 206. Further, the construction site plan 200 may indicate a transition between the first and second path plans 204, 206. For example, if the first path plan 204 is to be completed first, the construction site plan 200 may determine the starting point of the second path plan 206 based on an end point of the first path plan 204, based on a desired end point of the second path plan 206, based on terrain to be traversed between the first and second path plans 204, 206, based on one or more obstacles, based on terrain outside of the worksite boundary 202, a combination of these, or the like.

In at least one example, at least a portion of the first paths 224-234 and the second paths 252-262 line up, and the autonomous construction vehicle is made to move, for example, along a first path in the first movement direction 248 toward a common boundary line 214 between the first and second path plans 204, 206 and then continue to move along a second path in the second movement direction 276 away from the common boundary line 214, then along another second path in the second movement direction 276 toward the common boundary line 214 and along another first path away from the common boundary line 214, and so on.

While in the illustrated example, the movement of the autonomous construction vehicle is aligned with the slope, in other examples, the path plan can indicate a movement direction of the autonomous construction vehicle such that the slope that exceeds the threshold value is not a side slope relative to movement of the autonomous construction vehicle. In at least one example, a construction site plan may include more than one slope (each slope having a different slope direction) that exceeds the threshold value, and the path plan could include paths that run at an angle to both slopes, such that neither slope is a side slope relative to the movement of the autonomous construction vehicle. As such, the side slope would remain below the threshold value.

Figure 3:
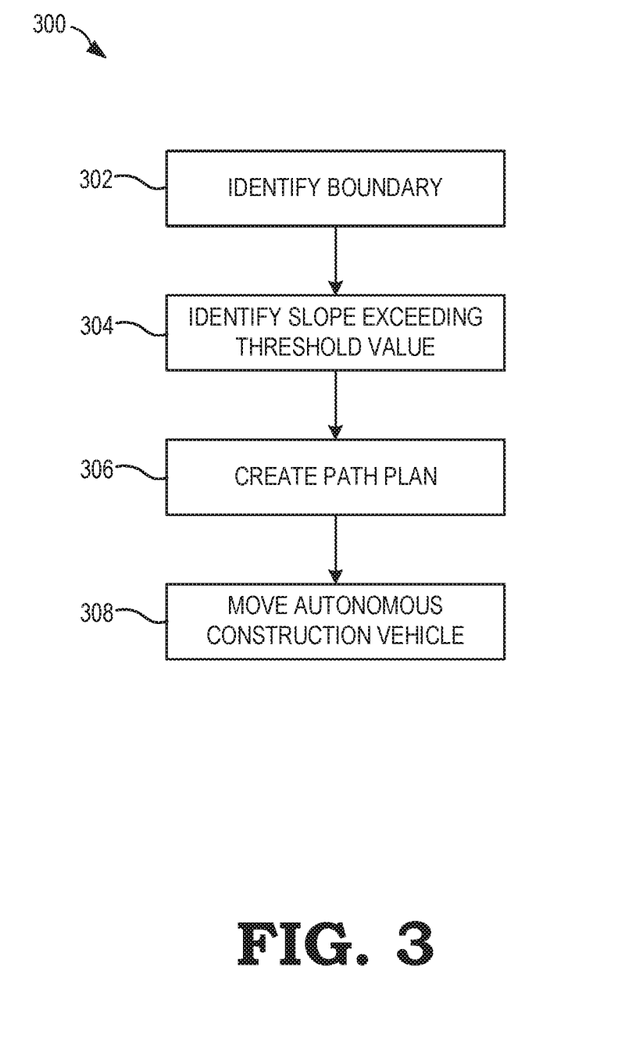
FIG. 3 is flow chart of a method for controlling an autonomous construction vehicle, in accordance with at least one example.

FIG. 3 is flow chart of a method 300 for controlling an autonomous construction vehicle, in accordance with at least one example, which will be described with reference to FIG. 1 for ease of description. At block 302, a boundary 102 of a construction site 100 is identified. The construction site 100 or the worksite boundary 102 may be downloaded or otherwise retrieved. In at least one example, a controller creates the worksite boundary 102 based on data about the construction site 100 that is downloaded or otherwise received. In some examples, 3D work area terrain information is received from a back office or from another machine. In at least one example, the boundary 102 is identified based on the autonomous construction vehicle or another vehicle driving over the construction site 100. At block 304, a slope exceeding a threshold value is identified. In some examples, the controller analyzes elevation changes in the construction site 100. In at least one example, the controller compares elevation changes of the construction site 100 to machine performance capabilities. In at least one example, a controller may access slope data corresponding to slopes within the worksite boundary 102. In at least one example, the controller may determine if a slope exceeds the threshold value. In some examples, the controller may identify multiple slopes that exceed the threshold value.

At block 306, the controller creates a path plan 112 corresponding to a slope that exceeds the threshold value. The controller maps the path plan 112 onto the construction site plan 100, such that a plurality of path lines 126-135 define a plurality of paths 114-124, each path 114-124 based on a slope direction 138 of the relevant slope that exceeds the threshold value. The paths 114-124 are selected such that the side slope of the autonomous construction vehicle does not exceed the threshold value. In at least one example, the paths 114-124 are selected such that the slope that exceeds the threshold value is not a side slope. The paths 114-124 may align with the slope that exceeds the threshold value, or may otherwise be positioned in a direction such that the slope that exceeds the threshold value will not be a side slope relative to the autonomous construction vehicle as it moves along the paths 114-124. In some examples, more than one slope may exceed the threshold value, and the controller may divide the construction site plan 100 into sections, such that each section includes a path plan corresponding to a slope that exceeds the threshold value (see FIG. 2 for example).

At block 308, the autonomous construction vehicle is moved by a controller (external or on the construction vehicle) according to the construction site plan 100. For example, within each path plan 112, the autonomous construction vehicle will move in a movement direction 140 designated by the paths 114-124 such that the slope direction 138 is not a side slope relative to the autonomous construction vehicle as it moves along the paths 114-124. To put it another way, as the autonomous construction vehicle moves along the paths 114-124, the autonomous construction vehicle does not traverse or experience a side slope that exceeds the threshold value. In at least one example, an external controller communicates the construction site plan 100 to a vehicle controller to control the movement of the autonomous construction vehicle based on one or more slopes within the worksite boundary 102.

Figure 4:
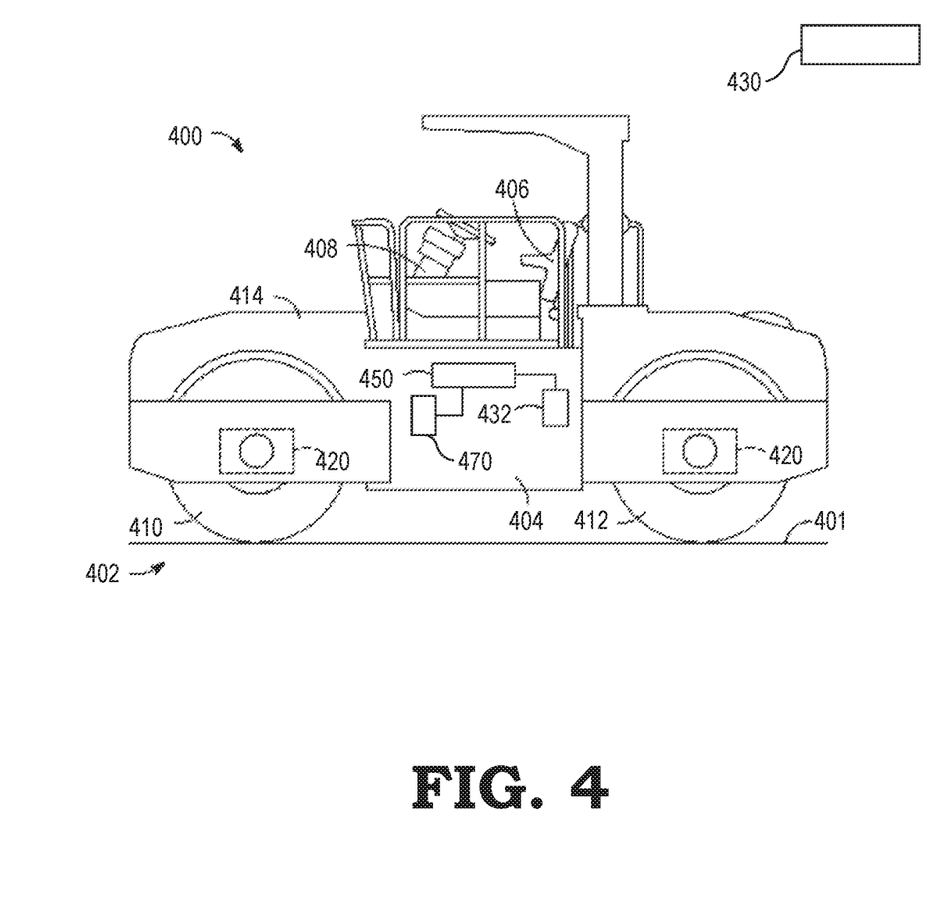
FIG. 4 depicts an autonomous construction vehicle, in accordance with at least one example of the present disclosure.

FIG. 4 depicts a system for controlling an autonomous construction vehicle 400, in accordance with at least one example of the present disclosure. Autonomous construction vehicles may include any vehicle used on a constructions site that could benefit from autonomous control. Autonomous construction vehicles may include, for example, cold planers, paving machines, graders, compaction machines, tractors, or the like. To rehabilitate roadways for continued vehicular use, spent asphalt is removed in preparation for resurfacing using a cold planer, sometimes also called road mills or scarifiers, to break up and remove layers of an asphalt roadway. A cold planer typically includes a milling drum, fitted with cutting tools, that is rotated to break up the surface of the roadway.

Paving machines are commonly used to apply and spread a mat of asphalt material relatively evenly over a work surface. These machines are generally used in the construction of roads and parking lots. A paving machine generally includes a hopper for receiving asphalt material, a conveyor system for transferring the asphalt from the hopper for discharge onto a roadbed, and a set of augers to evenly spread the paving material in front of a screed plate. The screed plate smooths the asphalt material, ideally leaving behind a mat of uniform depth, density, texture and smoothness.

Compaction machines are frequently employed for compacting fresh laid asphalt, dirt, gravel, and other compactable work materials associated with road surfaces. For example, during construction of roadways, highways, parking lots and the like, the loose asphalt that is deposited by the paving machines is compacted by one or more compactors traveling over the surface, whereby the weight of the compactor compresses the asphalt to a solidified mass.

In the illustrated example, the autonomous construction vehicle 400 is a compactor that can travel over a surface 401 compacting a work material 402, for example, an asphalt mat. Other types of compactors are contemplated to implement the disclosed process and device including soil compactors, asphalt compactors and vibratory compactors, for example. The compactor machine 400 includes a body or frame 404 that inter-operatively connects the various physical and structural features that enable the compactor machine 400 to function. These features may include an operator cab 406 that is mounted on top of the frame 404, from which an operator may control and direct operation of the compactor machine 400. Additionally, a steering apparatus 408 and similar controls may be located within the operator cab 406. To propel the compactor machine 400 over the surface 401, an engine 414, such as an internal combustion engine, can also be mounted to the frame 404 and can generate power to physically move the compactor machine 400.

To enable motion of the compactor machine 400 relative to the surface 401, the illustrated compactor machine 400 includes a first roller drum 410 (or compacting element 410) and a second roller drum 412 (or compacting element 412) that are in rolling contact with the surface 401. Both the first roller drum 410 and the second roller drum 412 are rotatably coupled to the frame 404 so that the first and second roller drums 410, 412 roll over the surface 401 as the compaction machine 400 travels thereon. To transfer motive power from the power system to the surface 401, the power system can operatively engage and rotate the first roller drum 410, the second roller drum 412, or combinations thereof, through an appropriate power train (not shown).

It will be appreciated that the first roller drum 410 can have the same or different construction as the second roller drum 412. It should further be appreciated that the machine 400 may include a single roller drum and tires (not shown) to contact the surface 401. Both the first roller drum 410 and the second roller drum 412 may have a vibratory mechanism 420. While FIG. 4 shows both the first and second roller drums 410, 412 having a vibratory mechanism 420, in other embodiments there may be a single vibratory mechanism 420 located on either the first or the second roller drum 410, 412.

Compactor 400 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the machine 400 and that may cooperate to sense various functions, operations, and operating characteristics of the machine and/or aspects of the environment in which the machine is operating.

The overall operation of the construction vehicle 400 within a worksite may be managed by a vehicle controller 450 on the construction vehicle 400 or an external controller 430 that is at least partially in communication with the construction vehicle 400. Moreover, each construction vehicle 400 may include any one or more of a variety of feedback devices capable of signaling, tracking, monitoring, or otherwise communicating relevant machine information to the base station. For example, each machine 400 may include a locating device 432 configured to communicate with the external controller 430 via any of a variety of technology communication mechanisms to communicate various information pertaining to the position and/or orientation of the machine 400 relative to the construction site.

The vehicle controller 450 may receive input signals from an operator operating the construction vehicle 400 from within cab 406 or off-board through a wireless communications system. The vehicle controller 450 or the external controller 430 may control the operation of various aspects of the construction vehicle 400 including, for example, the drivetrain and the hydraulic systems. In some examples the vehicle controller 450 or the external controller 430 may perform some or all of the actions described with reference to the method 300 of FIG. 3.

The vehicle controller 450 may be an electronic controller that performs operations, executes control algorithms, stores and retrieves data and other desired operations. The vehicle controller 450 may include, or access, memory, secondary storage devices, processors, and any other components for running an application. The memory and secondary storage devices may be in the form of read-only memory (ROM) or random-access memory (RAM) or integrated circuitry that is accessible by the controller. Various other circuits may be associated with the vehicle controller 450 such as power supply circuitry, signal conditioning circuitry, driver circuitry, and other types of circuitry.

The vehicle controller 450 may be a single controller or may include more than one controller disposed to control various functions and/or features of the construction vehicle 400. The term "controller" is meant to be used in its broadest sense to include one or more controllers and/or microprocessors that may cooperate in controlling various functions and operations of the construction vehicle 400. The term "controller" does not include a human. The functionality of the controller 450 may be implemented in hardware and/or software without regard to the functionality. The controller 450 may rely on one or more data maps relating to the operating conditions and the operating environment of the machine 400 and a construction site that may be stored in memory. Each of these data maps may include a collection of data in the form of tables, graphs, digital images and/or equations.

External controller 430 may include or access memory, secondary storage devices, processors, and any other components for running an application. Control of the construction vehicle 400 may be implemented in any number of different arrangements. For example, control may be at least partially implemented at external controller 430 situated locally and/or remotely relative to the construction site with sufficient means for communicating with the construction vehicle 400, via any of a variety of wireless communication systems, for example via a satellite, or the like. Using any of the foregoing arrangements, external controller 430 may generally be configured to monitor the position of the compactor 400 relative to the construction site and a predetermined target compaction operation and provide instructions for controlling the compactor 400 in an efficient manner to compact surface 401. In at least one example, the external controller 430 may wirelessly communicate a construction site plan to the vehicle controller 450.

Construction vehicle 400 may be configured to be operated autonomously, semi-autonomously, or manually. When operating semi-autonomously or manually, the construction vehicle 400 may be operated by remote control and/or by an operator physically located within the cab 406.

Construction vehicle 400 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the construction vehicle 400 and that may cooperate to sense various functions, operations, and operating characteristics of the machine and/or aspects of the environment in which the machine is operating.

The vehicle controller 450 may include a sensing system 470 configured to sense the position and orientation (i.e., the heading, pitch, roll or tilt, and yaw) of the machine relative to the construction site. The sensing system 470 may include a plurality of individual sensors that cooperate to generate and provide position signals to the vehicle controller 450 indicative of the position and orientation of the construction vehicle 400. In one example, the position sensor 470 may include one or more sensors that interact with a positioning system such as a global navigation satellite system or a global positioning system to operate as a position sensor. In another example, the position sensor 470 may further include a slope or inclination sensor such as pitch angle sensor for measuring the slope or inclination of the construction vehicle 400 relative to a reference, for example a ground or earth reference.

The vehicle controller 450 may use position signals from the position sensors 470 to determine the position of the construction vehicle 400 within a construction site. In other examples, the position sensor 470 may include a perception-based system, or may use other systems such as lasers, sonar, or radar to determine all or some aspects of the position of the construction vehicle 400. The position sensing system 470 may also be used to determine a ground speed of the construction vehicle 400. Other sensors or a dedicated ground speed sensor may alternatively be used to determine the ground speed of the construction vehicle 400. Sensors may also be provided to monitor the operating conditions of the machine engine and drivetrain such as an engine speed sensor. Other sensors necessary or desirable for operating the construction vehicle 400 may be provided.

While the construction vehicle 400 is illustrated as a compactor machine, one of ordinary skill in the art would understand that the systems and methods of the present application extend to other construction vehicles.

The expression "configured to", as used herein, may be replaced with "suitable for," "having the capacity to," "designed to," "adapted to," "made to," or "capable of", according to a context. The term "configured to" does not necessarily mean "specifically designed to" in a hardware level. Instead, the expression that an apparatus is "configured to" may mean that the apparatus is "capable of" along with other devices, hardware, firmware, software or parts in a certain context. For example, "a controller configured to perform an operation" may mean a dedicated controller for performing the operation, or a generic-purpose controller (e.g., a CPU or an application processor) capable of performing the operation by executing one or more software programs stored in a memory device.

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific examples. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific examples. However, the benefits, advantages, solutions to problems, and any feature(s) that may cause any benefit, advantage, or solution to occur or become more pronounced are not to be construed as a critical, required, or essential feature of any or all the claims. Moreover, the particular examples disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular examples disclosed above may be altered or modified and all such variations are considered within the scope of the disclosed subject matter. Accordingly, the protection sought herein is as set forth in the claims below.

INDUSTRIAL APPLICABILITY

The disclosed systems and methods for construction site planning and controlling an autonomous construction vehicle involve controlling movement of an autonomous construction vehicle based on one or more slopes present within a worksite boundary. A path plan within the worksite boundary takes into account slopes within the worksite boundary that exceed a threshold value, such that the path plan designates paths for the autonomous construction vehicle to move in a movement direction that does not result in a side slope that exceeds the threshold value (for example, the movement direction may align with the direction of the slope that exceeds the threshold value, or within a range of angles relative to the slope direction). Selecting the movement direction such that the side slope does not exceed the threshold value helps facilitate the autonomous construction vehicle maintaining upright, maintaining traction with a surface of the construction site, maintaining efficient operation, etc. In contrast, if the construction vehicle were to travel transverse to the slope direction such that the slope direction is a side slope relative to the movement of the autonomous construction vehicle, the autonomous construction vehicle might not function properly or as efficiently and might be at risk for tipping over or sliding down the slope.

What is claimed is:

1. A method for controlling an autonomous construction vehicle, comprising:
identifying a boundary of a construction site;
identifying a first slope of the construction site;
determining if the first slope exceeds a predetermined threshold value, the predetermined threshold value corresponding to a predetermined maximum side slope value for the autonomous construction vehicle;
creating, at a controller, a first path plan for the autonomous construction vehicle based on whether the first slope exceeds the threshold value; and
controlling the operation of the autonomous construction vehicle based on the first path plan.

2. The method of claim 1, wherein creating the path plan includes aligning movement of the autonomous construction vehicle with the first slope if the first slope exceeds the predetermined threshold value.

3. The method of claim 1, wherein controlling the operation of the autonomous construction vehicle includes controlling a movement direction of the autonomous construction vehicle.

4. The method of claim 1, wherein controlling the operation of the autonomous construction vehicle includes moving the autonomous construction vehicle along the path plan within the construction site.

5. The method of claim 1, further comprising:
identifying a second slope within the boundary of the construction site;
determining if the second slope exceeds the predetermined threshold value;
creating, at a controller, a second path plan for the autonomous construction based on whether the second slope exceeds the threshold value; and
controlling the operation of the autonomous construction vehicle based on the second path plan.

6. The method of claim 5, further comprising:
dividing, at the controller, the construction site into first and second sections based on the first and second slopes exceeding the predetermined threshold value;
wherein the first section includes the first path plan and the second section includes the second path plan.

7. The method of claim 6; wherein controlling the operation of the autonomous construction vehicle comprises:
aligning the vehicle movement with the first slope in the first section; and
aligning the vehicle movement with the second slope in the second section.

8. A method for controlling an autonomous construction vehicle, comprising:
mapping, at a controller, a construction site plan including a worksite boundary;
accessing, at the controller; slope data corresponding to a surface within the worksite boundary;
mapping, at the controller, a first path plan onto the construction site plan such that a first slope is not a side slope relative to movement of the autonomous construction vehicle; and
wirelessly communicating the construction site plan from the controller to the autonomous construction vehicle.

9. The method of claim 8, further comprising:
determining, at the controller, that the first slope exceeds a predetermined threshold value.

10. The method of claim 9, further comprising:
mapping, at the controller, a second path plan onto the construction site plan to align movement of the autonomous construction vehicle with a second slope that exceeds the predetermined threshold value.

11. The method of claim 10, wherein the first path plan includes path lines extending in a first direction, and the second path plan includes path lines extending in a second direction, wherein the first direction is different than the second direction.

12. The method of claim 10, further comprising:
mapping, at the controller, a third path plan onto the construction site plan to align movement of the autonomous construction vehicle with a third slope that exceeds the predetermined threshold value.

13. The method of claim 8, further comprising:
mapping, at the controller, a plurality of sections onto the construction site plan based on differing slopes between the sections.

14. The method of claim 13, wherein the differing slopes differ in a slope direction.

15. The method of claim 14, further comprising:
mapping, at the controller, a corresponding path plan for each section of the plurality of sections, such that a path line of each path plan aligns with the slope direction, wherein the first path plan includes a plurality of path lines that align with a slope direction of the first slope.

16. A system, comprising:
an autonomous construction vehicle; and
a first controller configured to:
map a construction site plan including a worksite boundary;
access slope data corresponding to a surface within the worksite boundary;
map a first path plan onto the construction site plan such that a first slope that exceeds a predetermined threshold value is not a side slope relative to movement of the autonomous construction vehicle;
wherein the autonomous construction vehicle is configured to move according to the construction site plan.

17. The system of claim 16, further comprising:
a second controller, the second controller positioned on the autonomous construction vehicle;
wherein the first controller is external to the autonomous construction vehicle and configured to wirelessly communicate the construction site plan to the second controller; and
wherein the second controller is configured to control movement of the autonomous construction vehicle based on the construction site plan.

18. The system of claim 17, wherein the second controller is configured to move the autonomous construction vehicle up and down a plurality of path lines of the first path plan, wherein each of the plurality of path lines of the first path plan extends in a first direction to align with the first slope.

19. The system of claim 18, wherein:
the first controller is configured to map a second path plan including path lines extending in a second direction to align with a second slope that exceeds the predetermined threshold value, wherein the first direction is different than the second direction; and
the second controller is configured to change a direction of movement of the autonomous construction vehicle between the first and second path plans such that the autonomous construction vehicle moves in the first direction within boundaries of the first path plan and moves in the second direction within boundaries of the second path plan.

20. The system of claim 16, wherein the threshold slope value is about 30%.

* * * * *